E. A. HAMWI.
APPARATUS FOR MAKING PASTRY FORMS.
APPLICATION FILED NOV. 5, 1918.
1,342,045.
Patented June 1, 1920.
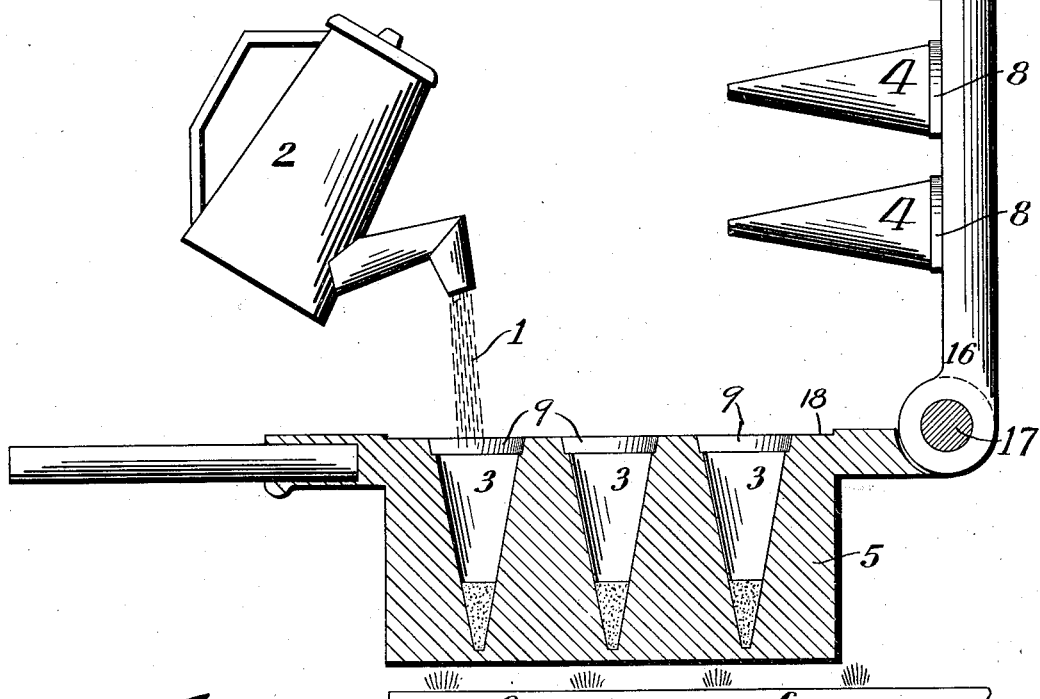
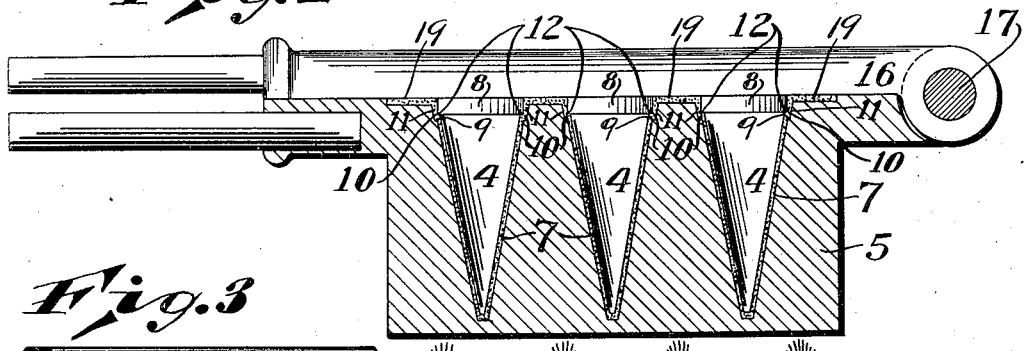
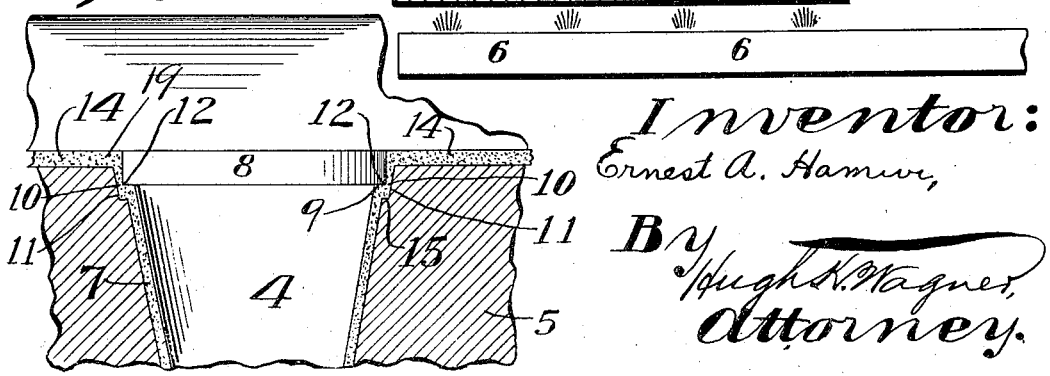
Inventor:
Ernest A. Hamwi,
By Hugh K. Wagner,
Attorney.

Inventor:
Ernest A. Hamwi,
By Hugh K. Wagner,
Attorney.

UNITED STATES PATENT OFFICE.

ERNEST A. HAMWI, OF ST. LOUIS, MISSOURI.

APPARATUS FOR MAKING PASTRY FORMS.

1,342,045.  Specification of Letters Patent.  Patented June 1, 1920.

Application filed November 5, 1918. Serial No. 261,284.

*To all whom it may concern:*

Be it known that I, ERNEST A. HAMWI, a citizen of the United States, residing at the city of St. Louis, in the State of Missouri, have invented certain new and useful Improvements in Apparatus for Making Pastry Forms, of which the following is a specification.

This invention consists of a new form of pastry cone and the method and apparatus for making the same.

Heretofore pastry cones have had unsightly ragged edges and the object of this invention is to eliminate these ragged edges and so to make the pastry forms as to finish them with smooth edges. While cones are mentioned, the invention *mutatis mutandis* is adaptable for other forms.

In the accompanying drawings forming part of this specification, in which like numbers of reference denote like parts wherever they occur, Figure 1 shows the female mold in section, the male mold open, and a receptacle for batter pouring batter into one of the female molds;

Fig. 2 shows the mold closed, the female mold being shown in section so as to allow the shape assumed by the batter to be seen;

Fig. 3 is a fragmentary view on an enlarged scale of one of the female molds with the batter therein pressed into shape by the corresponding male mold;

Figure 4:
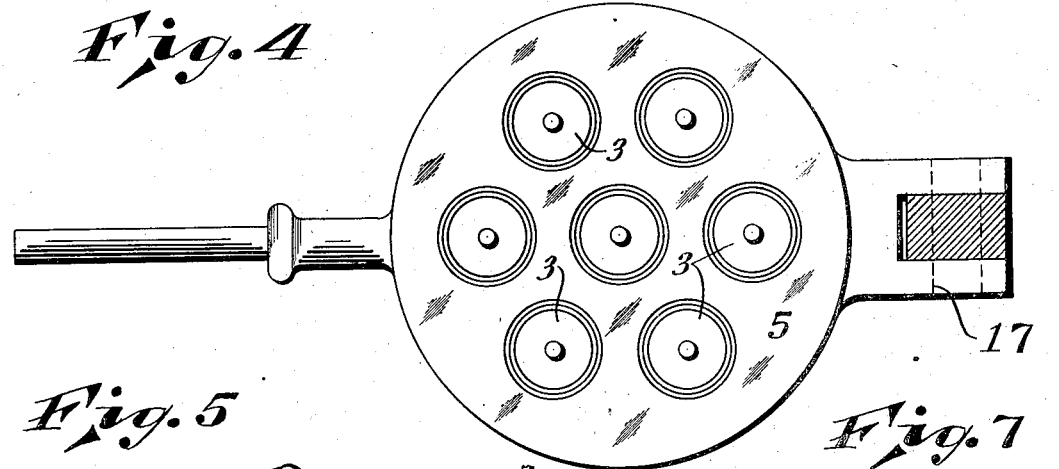
Fig. 4 is a top plan view of the female mold.

The usual batter 1 is placed in the receptacle 2 and therefrom poured into female molds 3 coacting with corresponding male molds 4 formed on the male mold body 16. The female mold body 5 is located in suitable proximity to a burner or series of burners 6, which provide the requisite heat for cooking the batter, while the cones remain pressed as shown in Figs. 2 and 3 between the male molds 4 and the female molds 3. As shown in these figures the batter takes the form of a cone 7 or any other shape provided by the molds. The face of the female body 5 is countersunk or cut away as at 18 whereby the cones when baked will be detachably interconnected as at points 19 by the baked batter, thus facilitating handling of the same. This invention in part consists in the flange 8 surrounding the male mold and the shoulder 9 running around the interior of the female mold whereby a special thinness of material is caused to occur immediately above the shoulder 9, that is to say, at 10. This is due to the slanting direction of the part 11 of the female cone and the rectangular corner 12 of the flange 8 on the male mold, which coming together as best seen in Fig. 3, squeeze out the batter and leave the extra thin part 10. Flange 8 may be formed of a mere washer encircling the male mold.

Figure 5:
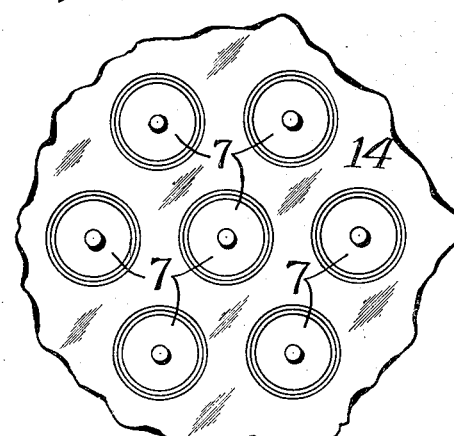
Fig. 5 is a top plan view of a group of pastry cones after they have been pressed or formed and removed from the female mold, and before being detached from each other.
Figure 6:
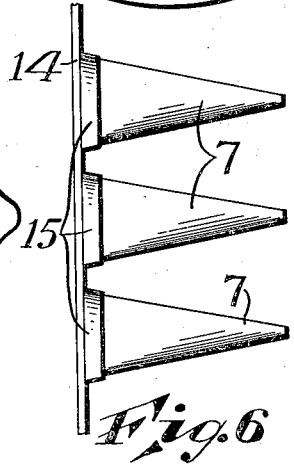
Fig. 6 is a side elevation of the subject-matter of Fig. 5.
Figure 7:
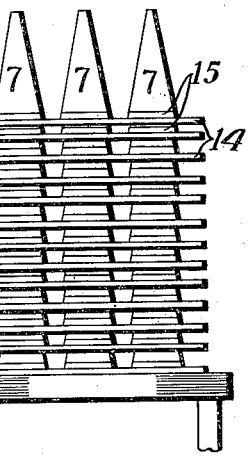
Fig. 7 is a side elevation of a stack of the subjects-matter of Figs. 5 and 6.
Figure 8:
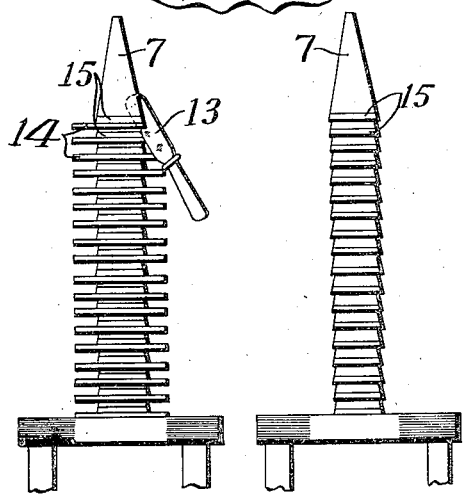
Fig. 8 is an end view of a single row of cones shown in Fig. 7 with the addition of a knife showing how the surplus material is knocked away.
Figure 9:
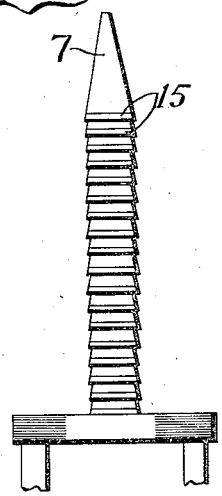
Fig. 9 is an elevation of a single stack of cones after the subject-matter of Fig. 7 has been treated as shown in Fig. 8.
Figure 10:
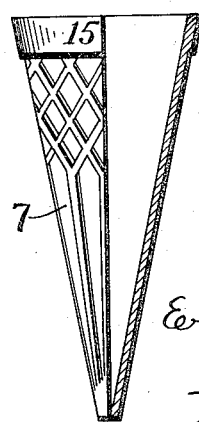
Fig. 10 is a view partly in section showing the completed cone after the surplus material has been broken away.

The batter is cooked to a crisp over the burners 6. Then the contents of all the molds is lifted out in the form shown in Figs. 5 and 6 and a plurality of the same stacked as appears in Fig. 7. Then a knife 13 is used to apply light blows or strokes to the surplus material 14 and this results in breaking the same away at the thin part 10, leaving instead of ragged edges, a neat smooth-edged flange 15, which is not only more sightly but obviates certain inconvenience and losses of time in packing and use caused by the present flangeless, rough-edge cones. The male mold body 16 is pivoted at 17 to the female mold body 5.

Having thus described this invention, I hereby reserve the benefit of all changes in form, arrangement, order, or use of parts, as it is evident that many minor changes may be made therein without departing from the spirit of this invention or the scope of the following claims.

I claim—

1. A mold for forming ice cream cones comprising a female mold body provided with a mold cavity enlarged at its upper end to provide an annular shoulder, the surface of the enlargement above the shoulder inclining upwardly and outwardly, a male mold body having a mold fitting in and spaced from the walls of the cavity and provided at its upper end with an annular enlargement to form a shoulder which is spaced from the shoulder on the female member and adapted to be fitted thereinto, the surface of the enlargement on the mold being vertical, whereby when the male and female members are brought together the distance between the lower edge of the shoulder on the mold and the adjacent inclined surface of the enlargement of the cavity will be less than the distance between the remaining portions of the surfaces of the mold and the cavity, whereby to form a weakened circular scoring in a cone baked in the mold.

2. A mold for forming ice-cream cones comprising a female mold body provided with a plurality of mold cavities enlarged at their ends to provide annular shoulders, said shoulders inclining upwardly and outwardly, a portion of the upper face of said female mold body being countersunk and communicating with the cavities for receiving batter, a male mold body carrying male molds engaging in and spaced from the walls of the cavities and provided at their upper ends with annular enlargements to form shoulders which are spaced from the shoulders on the female member when engaging therein, the surface of the enlargements on the molds being vertical, whereby when the male and female members are engaged, the distance between the lower edges of the shoulders on the molds and the adjacent inclined surfaces of the enlargement of the cavities will be less than the distance between the remaining portions of the surfaces of the molds and cavities, whereby to cause weakened circular scorings in the cones when baked.

In testimony whereof I hereunto affix my signature.

ERNEST A. HAMWI.